United States Patent
Key (10) Patent No.: US 9,506,347 B2
(45) Date of Patent: Nov. 29, 2016

(54) COMPRESSOR BLADE FOR GAS TURBINE ENGINE

(71) Applicant: Solar Turbines Incorporated, San Diego, CA (US)

(72) Inventor: Jeremiah W. Key, San Marcos, CA (US)

(73) Assignee: Solar Turbines Incorporated, San Diego, CA (US)

(*) Notice: Subject to any disclaimer, the term of this patent is extended or adjusted under 35 U.S.C. 154(b) by 1009 days.

(21) Appl. No.: 13/720,640

(22) Filed: Dec. 19, 2012

(65) Prior Publication Data

US 2014/0165592 A1  Jun. 19, 2014

(51) Int. Cl.
  *F01D 5/14*  (2006.01)

(52) U.S. Cl.
  CPC .............. *F01D 5/141* (2013.01); *Y02T 50/671* (2013.01); *Y02T 50/673* (2013.01)

(58) Field of Classification Search
  CPC ............ F01D 5/12; F01D 5/14; F01D 5/141; F05B 2240/30; F05B 2240/301; F05B 2240/302
  See application file for complete search history.

(56) References Cited

U.S. PATENT DOCUMENTS

| | | | | |
|---|---|---|---|---|
| 7,497,664 B2* | 3/2009 | Walter | ..................... | F01D 5/141 416/223 A |
| 7,766,624 B2* | 8/2010 | Arinci | ..................... | F01D 5/141 416/223 R |
| 7,785,074 B2 | 8/2010 | Novori et al. | | |
| 8,057,188 B2* | 11/2011 | Parker | ..................... | F01D 5/141 416/223 A |
| 8,449,261 B2* | 5/2013 | Kappis | ..................... | F01D 5/141 416/223 A |
| 8,573,945 B2* | 11/2013 | Wang | ..................... | F01D 5/141 416/223 A |
| 2010/0008785 A1 | 1/2010 | Tardif et al. | | |
| 2010/0054946 A1 | 3/2010 | Orosa et al. | | |
| 2011/0116917 A1 | 5/2011 | Wang et al. | | |

FOREIGN PATENT DOCUMENTS

| | | |
|---|---|---|
| GB | 2381298 | 4/2003 |
| JP | 08284884 | 10/1996 |
| JP | 2002048095 | 2/2002 |
| JP | 2011122535 | 6/2011 |

* cited by examiner

*Primary Examiner* — Richard Edgar (74) *Attorney, Agent, or Firm* — Finnegan, Henderson, Farabow, Garrett & Dunner, LLP (57) ABSTRACT

A compressor blade for a gas turbine engine includes a root configured to engage a hub of the gas turbine engine, and an airfoil radially extending a distance from the root to a tip. The airfoil includes a suction side, a pressure side, a leading edge connecting the suction and pressure sides, and a trailing edge connecting the suction and pressure sides opposite the leading edge. The distance that the airfoil extends from the root to the tip may be divided into a plurality of radially adjacent regions. At least one, but not all, of the plurality of radially adjacent regions may have a substantially constant thickness.

24 Claims, 5 Drawing Sheets

COMPRESSOR BLADE FOR GAS TURBINE ENGINE

TECHNICAL FIELD

The present disclosure relates generally to a gas turbine engine ("GTE") and, more particularly, to a compressor blade for a gas turbine engine.

BACKGROUND

A GTE includes a multistage axial compressor that pressurizes air and mixes the pressurized air with fuel. The mixture is directed into a combustor where it ignites, generating hot combustion gases that flow downstream through a high-pressure turbine. The turbine converts heat energy from the gases into mechanical energy. A portion of the mechanical energy is used to drive the compressor, while a remaining portion is directed offboard for other purposes. For example, the remaining portion of mechanical energy can be directed to drive a generator to produce electricity, to propel a vehicle, and/or to drive a compressing or pumping device.

Each stage of the compressor usually includes a row of spaced apart blades, each blade comprising an airfoil that extends radially outward from a supporting rotor hub. The airfoils are subject to high temperatures and high local stresses (e.g., bending and/or vibratory stresses) during operation. These stresses can cause cracks to form at a tip and/or attachment region of the airfoil. Unless otherwise accounted for, the cracks can result in GTE performance losses due to mechanical failure.

U.S. Pat. No. 7,497,664 ("the '664 patent") describes a method and apparatus for reducing vibrations induced in compressor blades. According to the '664 patent, compressor blades can be designed to have a thickness profile that purportedly reduces cracking and facilitates the distribution of blade tip stresses over a larger area of the blade airfoil. The profile includes a maximum thickness that varies along a span of the airfoil according to a chord length of the airfoil.

SUMMARY

In one aspect, the present disclosure is related to a compressor blade for a gas turbine engine. The compressor blade may include a root configured to engage a hub of the gas turbine engine, and an airfoil radially extending a distance from the root to a tip. The airfoil may have a suction side, a pressure side, a leading edge connecting the suction and pressure sides, and a trailing edge connecting the suction and pressure sides opposite the leading edge. The distance that the airfoil extends from the root may be divided into a plurality of radially adjacent regions. At least one, but not all, of the plurality of radially adjacent regions away from the base and the tip may have a substantially constant thickness.

In another aspect, the present disclosure is related to another compressor blade for a gas turbine engine. This compressor blade may have a root configured to engage a hub of the gas turbine engine, and an airfoil radially extending a distance from the root. The airfoil may have a suction side, a pressure side, a leading edge connecting the suction and pressure sides, and a trailing edge connecting the suction and pressure sides opposite the leading edge. The distance that the airfoil extends from the root may be divided into a base region radially adjacent the root, a mid-span region radially adjacent the base region, a transition region radially adjacent the mid-span region, and a tip region radially adjacent the transition region. The base region may have a thickness that reduces at a substantially constant rate toward the mid-span region. The mid-span region may have a thickness that remains substantially constant from the base region to the transition region. The transition region may have a thickness that varies in slope from the mid-span region to the tip region. The tip region may have a thickness that reduces at a substantially constant rate in a direction away from the transition region.

In yet another aspect, the present disclosure is related to yet another compressor blade for a gas turbine engine. This compressor blade may include a root configured to engage a hub of the gas turbine engine, and an airfoil radially extending a distance from the root. The airfoil may have a suction side, a pressure side, a leading edge connecting the suction and pressure sides, and a trailing edge connecting the suction and pressure sides opposite the leading edge. The airfoil may have a thickness profile curve at a midpoint of a chord extending between the leading edge and the trailing edge that has a slope less than about 5% for about 10-40% of the distance that the airfoil extends from the root and greater than about 5% throughout a remaining portion of the distance.

In still another aspect, the present disclosure is related to another compressor blade for a gas turbine engine. This compressor blade may include a root configured to engage a hub of the gas turbine engine, and an airfoil having a suction side, a pressure side, a leading edge connecting the suction and pressure sides, and a trailing edge connecting the suction and pressure sides opposite the leading edge. The airfoil may extend a radial distance from the root. The airfoil may have a thickness profile curve at a midpoint of a chord extending between the leading edge and the trailing edge that is substantially constant during a second quarter of the radial distance and varies during a remainder of the radial distance.

DETAILED DESCRIPTION

Figure 1:
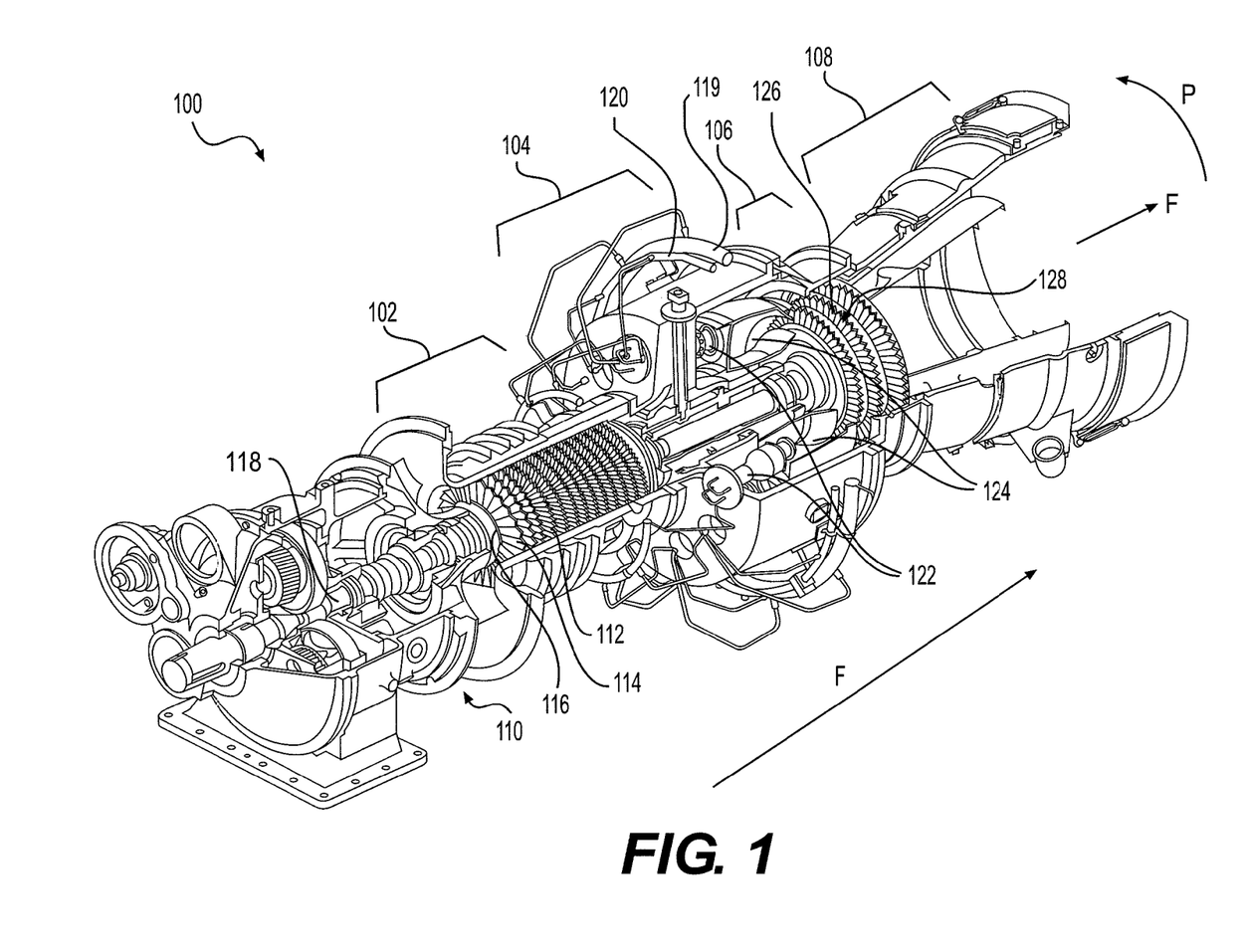
FIG. 1 is a cutaway view illustration of an exemplary disclosed gas turbine engine.

FIG. 1 illustrates an exemplary GTE 100, consistent with the disclosed embodiments. GTE 100 may be associated with any type of stationary or mobile machine. For example, GTE 100 may be part of a generator set that generates electrical power for a utility grid. In other embodiments, GTE 100 may power a compressor or other oil or gas pumping device. In still other embodiments, GTE 100 may be the prime mover of an earth-moving machine, a locomotive, a marine vessel, an aircraft, or another type of mobile machine.

GTE 100 may include, among other systems, a compressor system 102, a combustor system 104, a turbine system 106, and an exhaust system 108. In general, compressor system 102 may collect air via an intake 110, and successively compresses the air in one or more consecutive stages 112. As will be discussed in more detail below, each stage 112 may include a plurality of compressor blades 114 mounted to a hub 116, which is fixed to a rotational shaft 118 of GTE 100. As blades 114 drive hub 116 to rotate shaft 118, intake air is compressed and directed into combustor system 104.

A gaseous and/or liquid fuel may be directed in parallel with the compressed air into combustor system 104, for example by way of a gaseous fuel pipe 119 and/or a liquid fuel pipe 120, respectively. The fuel may be sprayed into a combustor 124 of combustor system 104 by a plurality of radially-arranged fuel injectors 122, mixed with the compressed air, and ignited.

Combustion of the fuel in combustor 124 may produce combustion gases having an elevated pressure, temperature, and/or velocity. These combustion gases may then be directed into turbine system 106. In turbine system 106, the high-pressure/high-temperature combustion gases may expand against a plurality of turbine blades 126 to drive one or more turbine wheels 128, thereby generating mechanical power that rotates shaft 118. Spent combustion gases may then be exhausted to the atmosphere through exhaust system 108. The compressed air and exhaust may generally flow in a direction F parallel to an axis of shaft 118. It should be noted that, although GTE 100 is shown as having a single shaft 118, it is contemplated that multiple shafts may alternatively be included and arranged in series or parallel, as desired.

Figure 2:
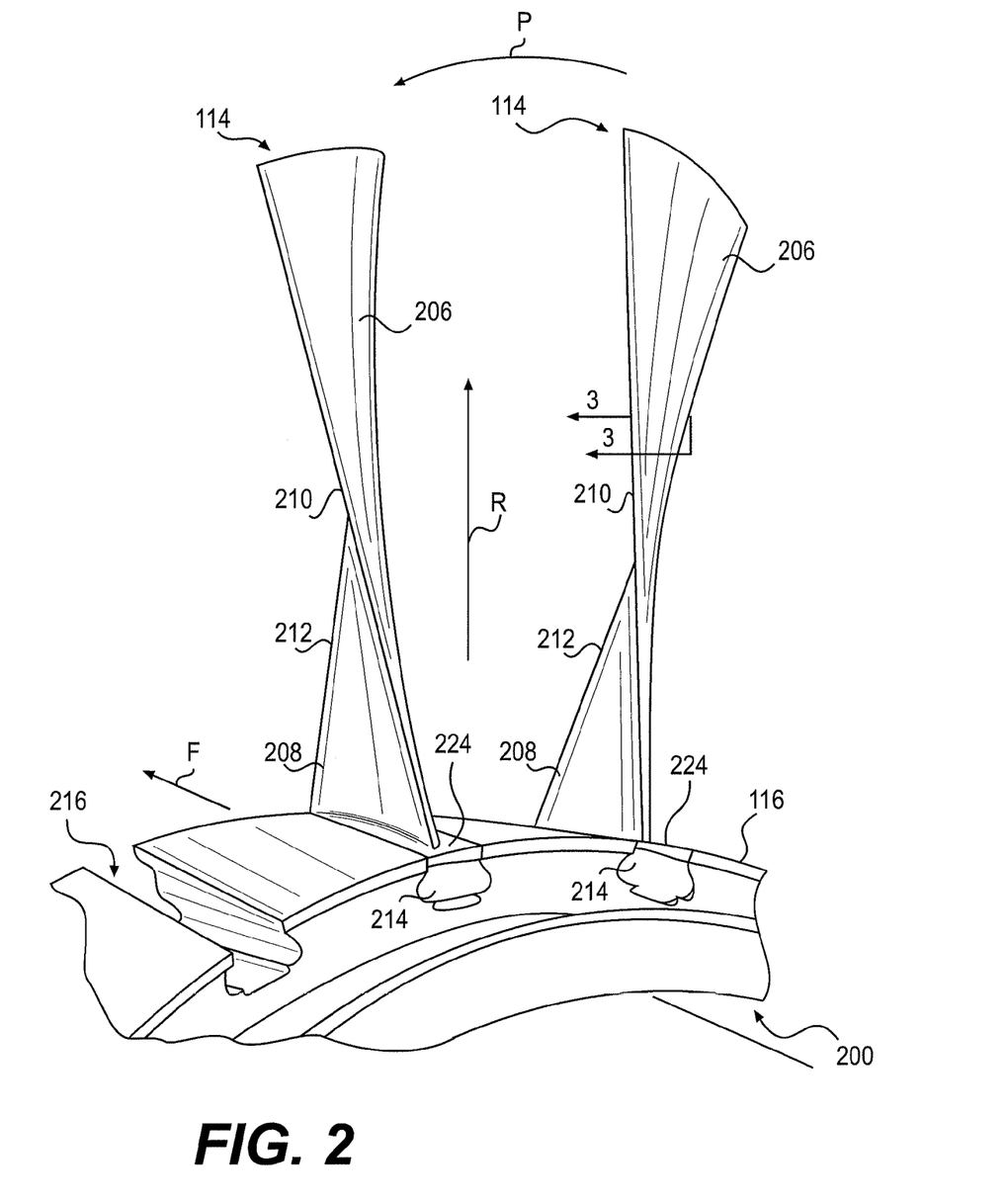
FIG. 2 is a perspective view illustration of an exemplary disclosed compressor that may be used in conjunction with the gas turbine engine of FIG. 1.

FIG. 2 shows an exemplary representation of compressor blades 114 and hub 116 arranged together as a rotor assembly 200. Rotor assembly 200 may be associated with any one or more of compressor stages 112 (FIG. 1). In operation, hub 116 may rotate with shaft 118 in a direction P, causing the compressed air to flow in the direction F (i.e., substantially parallel to the axis of the GTE 100) generally perpendicular to the rotational direction P.

Each compressor blade 114 may include an airfoil 218 having a suction sidewall 206 on a low-pressure side of compressor blade 114, and a pressure sidewall 208 on a high-pressure side of compressor blade 114. A leading edge 210 may connect suction and pressure sidewalls 206, 208 at an upstream location (with respect to the flow direction F), while a trailing edge 212 may connect suction and pressure sidewalls 206, 208 at a downstream location.

Each compressor blade 114 may extend a distance in a radial direction R from hub 116. In particular, airfoil 218 of each compressor blade 114 may be connected at a base end to a root 214 (also known as a lobe or platform). Root 214 may be formed into a general dovetail shape that is configured to slide into a corresponding slot 216 in hub 116, thereby connecting airfoil 218 to hub 116. In the embodiment shown in FIG. 2, slots 216 may be "angled" slots, meaning that compressor blades 114 mount to hub 116 by sliding their dovetail roots 214 into similarly shaped slots 216 in a direction that is angled relative to direction F of GTE 100. In the disclosed embodiment, the angle between slots 216 and the axial direction F may be about 15-25° (e.g., about 21°). It is contemplated, however, that other angles and/or other types of slots 216 (e.g., straight axial and/or circumferential slots) may alternatively be used with blades 114, if desired. Root 214 may then be fixed at its exposed periphery to hub 116, for example by way of detents, tabs, etc.

Figure 3:
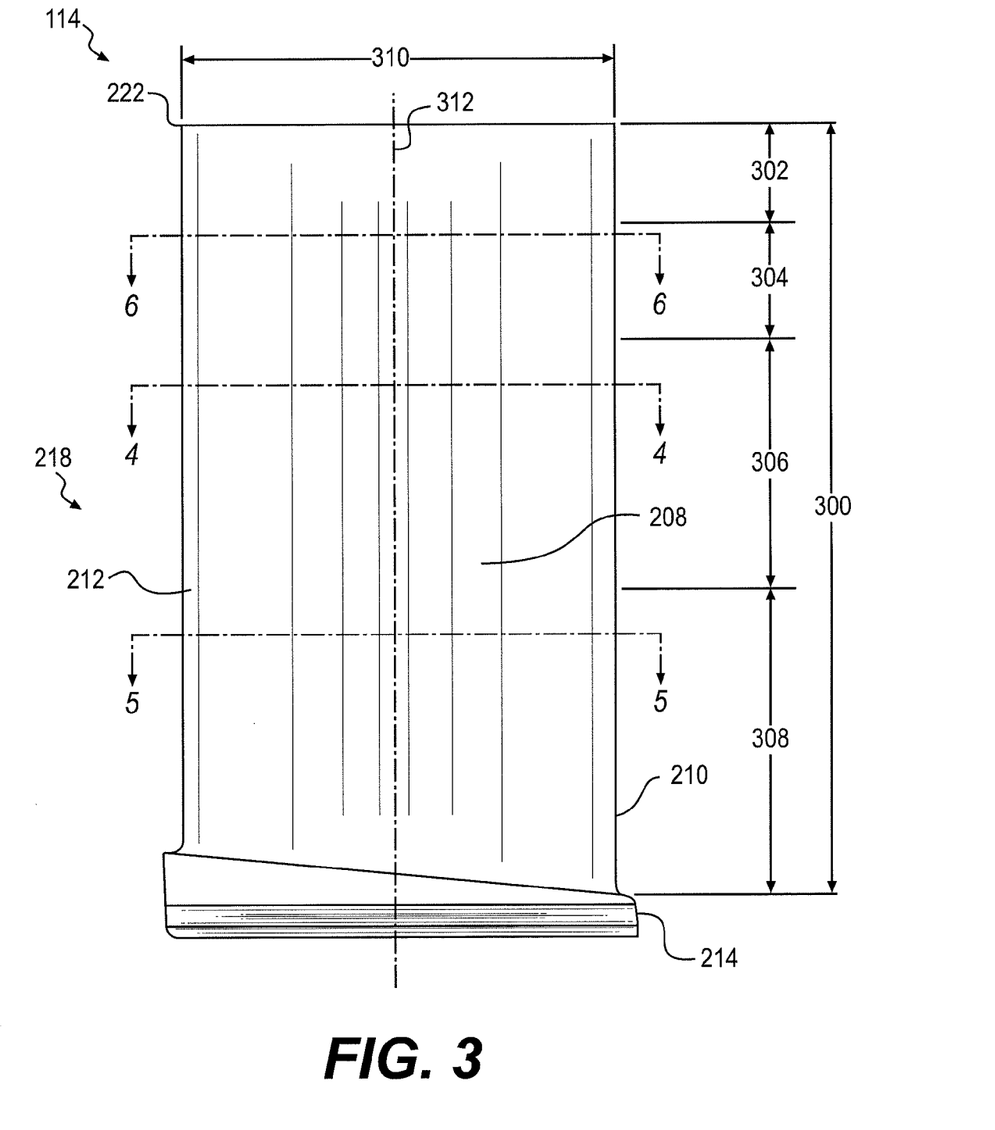
FIG. 3 is a side view illustration of an exemplary disclosed blade that may be used in conjunction with the compressor of FIG. 2.

FIG. 3 illustrates an exemplary compressor blade 114, as viewed from the high-pressure side of airfoil 218. Airfoil 218 may have a span 300 (i.e., a radial distance or a height in a radial direction) that terminates at a distal tip 222. The profile of airfoil 218 may be at least partially defined by a chord 310 (also referred to as a chord length or width) extending as a straight line between leading edge 210 and trailing edge 212. A centerline 312 of compressor blade 114 may extend through a center of chord 310 and be oriented generally perpendicular to chord 310 at any given span location. That is, airfoil 218 may twist along its span 300 relative to the flow direction F, and centerline 312 may likewise twist to remain generally perpendicular to chord 310. The length of chord 310 may be substantially constant along span 300 of compressor blade 114 (shown in FIG. 3) or vary, as desired. For example, chord 310 may have a greatest length at a location proximate root 214 and a smallest length at tip 222 (or vice versa), such that airfoil 218 tapers along span 300 toward or away from tip 222. In the disclosed embodiment, chord 310 has a length of about 1.46 inches (3.7 cm).

The profile of airfoil 218 may be further defined by various regions extending radially along span 300. For example, a first region extending from tip 222 a distance toward root 214 may be referred to as a tip region 302; a second region adjacent to (i.e., immediately radially inward of) tip region 302 may be referred to as a transition region 304; a third region adjacent to (i.e., immediately radially inward of) transition region 304 may be referred to as a mid-span region 306; and a fourth region adjacent to (i.e., immediately radially inward of) mid-span region 306 may be referred to as a base region 308. Each region 302-308 can be described as extending in the radial direction (i.e., as having a length that is) a certain percentage of the entire length of span 300. For example, base region 308 may be located in a first quarter of airfoil 118 and extend about 10-40% of the distance from root 214 to tip 222; mid-span region 306 may be located in a second quarter of airfoil 118 and extend about 10-40% of the length of span 300 and encompass a radial half-way point or center of blade 114; transition region 304 may be located in a third quarter of airfoil 118 and extend about 10-30% of the length of span 300; and tip region 302 may be located in a fourth quarter of airfoil 118 and extend about 5-25% of the length of span 300. For an exemplary disclosed span length of about 3.5 inches (8.9 cm), base region 308 may have a radial length of about 0.87 inches (2.2 cm); mid-span region 306 may have a radial length about 0.87 inches (2.2 cm); transition region 304 may have a radial length of about 0.71 inches (1.8 cm); and tip region 302 may have a radial length of about 0.51 inches (1.3 cm).

Figure 4:
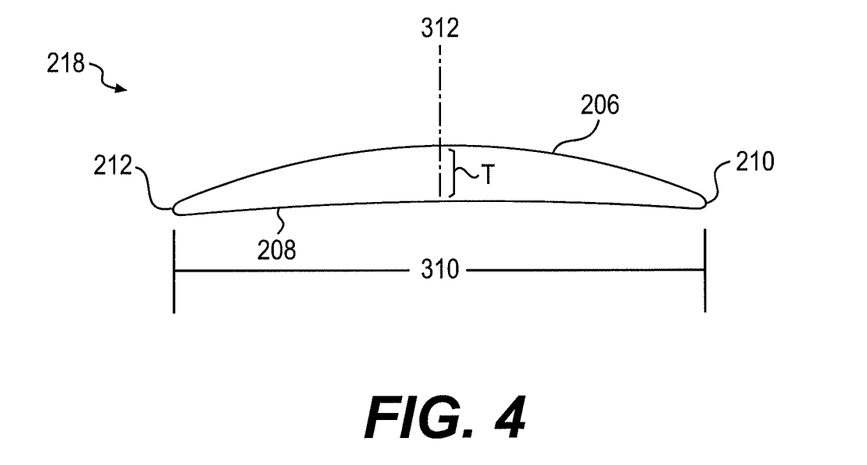
FIG. 4 is an end view illustration of the blade of FIG. 3 at a particular span location.

A thickness T of airfoil 218, as shown in the cross-sectional end view of FIG. 4, may be defined as a distance between suction sidewall 206 and pressure sidewall 208 in a direction generally orthogonal to chord 310. As described in more detail below, the thickness T can vary along the radial lengths of and/or between regions 302-308. Likewise, a rate of thickness change (i.e., a thickness profile curve or slope) may also change along the radial lengths and/or between regions. For example, the thickness T of airfoil 218 may decrease along the length of span 300 from base region 308 to tip region 302 (i.e., airfoil 218 may become thinner towards tip 222). The thickness T may change linearly or non-linearly within particular regions and/or along some or most of the length of span 300, as desired.

In the disclosed embodiment, however, the thickness T of airfoil 218 within mid-span region 306 should remain substantially constant at a given chord location. That is, unlike regions 302, 304, and 308, the thickness T between suction sidewall 206 and pressure sidewall 208 at a given location along chord 310 anywhere along the length direction of mid-span region 306 should be substantially constant. As will be described in more detail below, this substantially constant thickness T may help to reduce stress (i.e., reduce resonance and/or distribute loading) within compressor blade 114, while simultaneously maintaining a low weight and desired performance characteristics.

Figure 5:
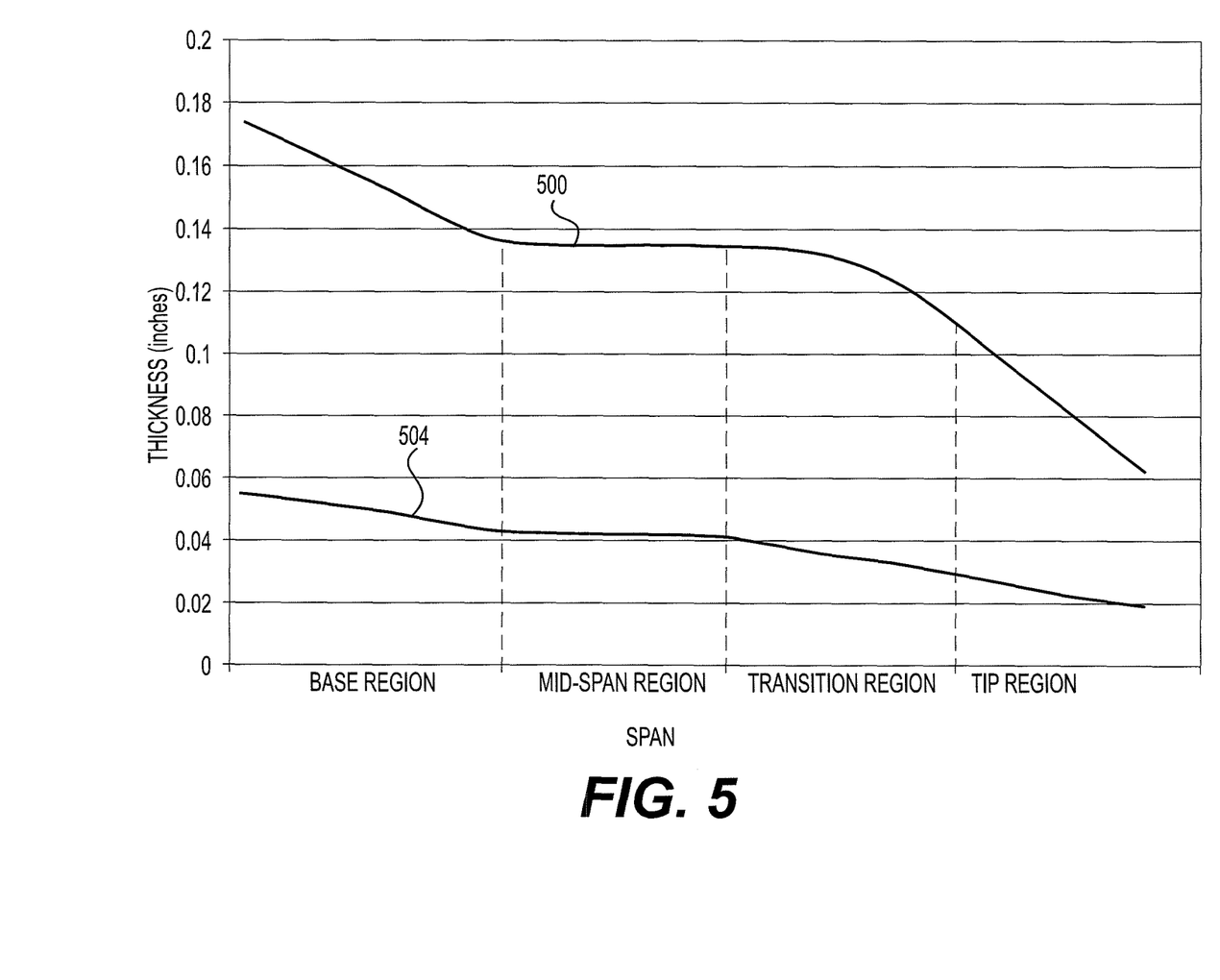
FIG. 5 is a graph depicting changing thicknesses of the blade of FIG. 3 along the span length of the blade.

FIG. 5 illustrates how the thickness T of airfoil 218 changes along the length of span 300. In particular, a first trace 500 corresponds with the thickness T of airfoil 218 at a midpoint along chord 310 corresponding to an area of greatest thickness ("the midpoint"). In some embodiments, this location of greatest thickness may be generally aligned with centerline 312. In other embodiments, however, this location of greatest thickness may be skewed somewhat toward leading edge 210. A second trace 504 corresponds with the thickness T of airfoil 218 at leading and/or trailing edges 210, 212. In the disclosed embodiment, the thickness T of airfoil 218 may be about the same at leading and trailing edges 210, 213, although this may not always be the case. As can be seen in these traces, the thickness T, in general, decreases along the length of span 300 toward tip 222. Specifically, at root 214 (i.e., at the extreme edge of base region 308), the thickness T of airfoil 218 at the midpoint may be about 0.175 inches (4.4 cm) and at leading and/or trailing edges 210, 212 about 0.045 inches (0.1 cm). And, at tip 222 (i.e., at the extreme edge of tip region 302), the thickness T of airfoil 218 at the midpoint may be about 0.062 inches (0.16 cm) and at leading and/or trailing edges 210, 212 about 0.02 inches (0.05 cm). Accordingly, traces 500, 504 illustrate a reduction at the midpoint of about 65% and at the edges of about 55%, from base region 308 to tip region 302. This reduction, however, occurs primarily only in base, transition, and tip regions 308, 304, and 302. The thickness T remains substantially constant within mid-span region 306. Although the rate of thickness reduction (i.e., slope of thickness T) within base region 308 may be about the same as within tip region 302 and substantially constant, it is contemplated that different rates of reduction may alternatively be utilized, if desired. The rate of thickness reduction within transition region 304 may vary throughout the region, from a slope of about 0% at mid-span region 306 to a slope of about 65% at tip region 302. The thickness T of leading and/or trailing edges 210, 212 may remain about 30-33% of the thickness T at the midpoint throughout all of the regions of airfoil 218. In general, the thickness T of airfoil 118, at the midpoint, may remain within the range of about 0.05-0.2 inches (0.13-0.5 cm).

For the purposes of this disclosure, a substantially constant thickness may be considered a thickness that varies by less than about 5% within a given area, while a substantially constant slope may be a slope that varies by less than about 5%. For example, within mid-span region 306, the thickness T may remain within about 0.132-0.138 inches (0.34 cm-35 cm) at the midpoint and about 0.041-0.043 inches (1.04 cm-1.09 cm) at leading and/or trailing edges 210, 212 throughout the span length of mid-span region 306. In other words, the slope within mid-span region 306 may be, at most, about 5%. Thus, airfoil 218 may have a thickness profile curve aligned in a radial direction along the midpoint that has a slope less than about 5% within mid-span region 306 and greater than about 5% throughout the remaining regions. And, the slope of airfoil 218 may only change significantly (e.g., greater than about 5%) within transition region 304.

It should be noted that transition region 304 may be omitted in some applications. In particular, it may be possible for mid-span region 306 to abruptly evolve into tip region 302 similar to the way in which base region 304 evolves into mid-span region 306. This may be exhibited by a sharp knee at the intersection of mid-span region 306 and tip region 302 and the omission of the gradually changing slope shown in FIG. 5.

INDUSTRIAL APPLICABILITY

The disclosed blade, although intended primarily for use within a compressor stage of a gas turbine engine, may be used in any stage of any fluid (e.g., gas, liquid, etc.) handling application. The profile of the disclosed compressor blade may provide enhanced longevity without significant weight increase or reduction in performance.

The enhanced longevity of blade 114 may be provided by a unique profile that may seem contrary to conventional design theory. In particular, conventional design theory of blades comparable to the disclosed blade 114 (i.e., blades having a thickness at their midpoint of about 0.05-0.2 inches) generally dictates that an increase in compressor blade mass will result in an increase in centrifugal forces acting on the blade. This increase in forces generally translates to an increase in the mean average stress acting on the blade and, hence, a reduction in component life. However, it has been determined that some blade failures may be caused primarily by alternating stresses of low magnitude and not necessarily the mean stress level. Accordingly, there may be some opportunity to reduce the alternating stresses at the cost of an increased mean stress level and still increase the life of the blade.

In the disclosed embodiment, mid-span region 306 of blade 114 may have a substantially constant thickness that is greater than the thickness of conventional blades. The thickness profile of blade 114 may be selected to move (i.e., detune) one or more of the natural frequencies of blade 114 out of the operating range of GTE 100. In one embodiment, five of the resonance frequencies (e.g., the $1^{st}$, $2^{nd}$, $5^{th}$, $6^{th}$, and $7^{th}$ resonance frequencies) of blade 114 have been moved out of the operating range. In addition, the profile of blade 114 may be designed to provide a safety factor or band around the operating range that is also de-tuned (i.e., the constant thickness of mid-span region 306 may extend in opposing directions slightly more than is necessary to detune the five frequencies), thereby accounting for any manufacturing inconsistencies between blades 114. And, although the mass and mean stress level of blade 114 may have increased due to its increased thickness, the alternating frequency of the stress may have reduced, thereby increasing the component life of blade 114.

In addition to increasing the component life of blade 114, the substantially constant thickness of mid-span region 306 may improve manufacturability. And because the increased thickness may be limited to only particular areas of blade 114 (i.e., limited to only mid-span region 306), the performance of compressor blade 114 may be maintained.

It will be apparent to those skilled in the art that various modifications and variations can be made to the disclosed embodiments without departing from the spirit and scope of the disclosure. Other embodiments will be apparent to those skilled in the art from consideration of the specification and practice of the disclosure. For example, although the disclosed compressor blade is described as having a dovetailed root, it is contemplated that the root could alternatively have another shape, if desired. That is, the root could have a double-tang shape or any other shape known in the art. In addition, although dimensions have been provided for a specific exemplary airfoil 218, it should be noted that the geometry of airfoil 218 may be scalable to match application demands. It is intended that the specification and examples be considered as exemplary only, with a true scope of the disclosure being indicated by the following claims and their equivalents.

What is claimed is:

1. A compressor blade for a gas turbine engine, the compressor blade comprising:
    a root configured to engage a hub of the gas turbine engine; and
    an airfoil having a suction side, a pressure side, a leading edge connecting the suction and pressure sides, and a trailing edge connecting the suction and pressure sides opposite the leading edge, a base of the airfoil being disposed adjacent to the root, the airfoil extending a distance along a radial direction from the base to a tip of the airfoil,
    wherein the distance that the airfoil extends from the base to the tip is divided into a first plurality of radially adjacent regions,
    a second plurality of radially adjacent regions includes all regions of the first plurality of radially adjacent regions except for a region including the tip and a region including the base,
    at least one region, but not all regions, of the second plurality of radially adjacent regions has a thickness that varies by less than 5 percent throughout the at least one region,
    the thickness of the at least one region of the second plurality of radially adjacent regions extends along a line perpendicular to a chord of the airfoil at a general midpoint of the airfoil, and
    a thickness of the airfoil decreases by 55-65% throughout a span of the airfoil.

2. The compressor blade of claim 1, wherein at least one of the leading edge and the trailing edge of the airfoil also has a substantially constant thickness throughout the at least one region of the second plurality of radially adjacent regions.

3. The compressor blade of claim 1, wherein the at least one region extends 10-40% of a span length of the airfoil.

4. The compressor blade of claim 3, wherein the span length of the airfoil is 3.5 inches.

5. The compressor blade of claim 1, wherein the thickness of the airfoil at the general midpoint of the airfoil decreases by 65% throughout the span, and
    the thickness of the airfoil of at least one of the leading edge and the trailing edge decreases by 55% throughout the span.

6. The compressor blade of claim 5, wherein the thickness at the general midpoint of the airfoil ranges from 0.062 inches to 0.175 inches; and
    the thickness at the at least one of the leading edge and the trailing edge of the airfoil ranges from 0.02 inches to 0.045 inches.

7. The compressor blade of claim 5, wherein the thickness of at least one of the leading edge and the trailing edge of the airfoil remains 30-33% of the radially corresponding thickness at the general midpoint throughout the span of the airfoil.

8. The compressor blade of claim 1, wherein the first plurality of radially adjacent regions includes a base region radially adjacent to the root, a mid-span region radially adjacent to the base region, a transition region radially adjacent to the mid-span region, and a tip region radially adjacent to the transition region, and
    the at least one region of the second plurality of radially adjacent regions includes only the mid-span region.

9. The compressor blade of claim 8, wherein the base region has a substantially constant slope of decreasing thickness, and
    the tip region has a substantially constant slope of decreasing thickness.

10. The compressor blade of claim 9, wherein the slope of the base region is the same as the slope of the tip region.

11. The compressor blade of claim 9, wherein the transition region has a slope that varies through its span.

12. The compressor blade of claim 11, wherein the slope of the transition region varies by 65%.

13. A compressor, comprising:
    a shaft;
    a hub connected to the shaft; and
    the compressor blade of claim 1 connected to the hub.

14. A gas turbine engine, comprising:
    a compressor system having the compressor of claim 13;
    a combustor system fluidly coupled to the compressor system;
    a turbine system fluidly coupled to the combustor system; and
    an exhaust system fluidly coupled to the turbine system,
    wherein the shaft extends from the compressor system to the turbine system.

15. A compressor blade for a gas turbine engine, the compressor blade comprising:
    a root configured to engage a hub of the gas turbine engine;
    an airfoil having a suction side, a pressure side, a leading edge connecting the suction and pressure sides, and a trailing edge connecting the suction and pressure sides opposite the leading edge, the airfoil radially extending a distance from the root,
    wherein the distance that the airfoil extends from the root is divided into a base region radially adjacent to the root, a mid-span region radially adjacent to the base region, a transition region radially adjacent to the mid-span region, and a tip region radially adjacent to the transition region,
    the mid-span region has a thickness that varies by less than 5 percent throughout the mid-span region, the thickness of the mid-span region extending perpendicular to a chord of the airfoil at a general midpoint along the chord of the airfoil,
    the transition region has a thickness that varies in slope from the mid-span region to the tip region,
    at least one of the base region and the tip region has a thickness that reduces at a substantially constant rate, and
    a thickness of the airfoil decreases by 55-65% throughout the base region, the transition region, and the tip region.

16. The compressor blade of claim 15, wherein the mid-span region extends from 0.35 inches to 1.4 inches of a span length of the airfoil, and the span length of the airfoil is 3.5 inches.

17. A compressor, comprising:
    a shaft;
    a hub connected to the shaft; and
    the compressor blade of claim 15 connected to the hub.

18. A gas turbine engine, comprising:
a compressor system having the compressor of claim 17;
a combustor system fluidly coupled to the compressor system;
a turbine system fluidly coupled to the combustor system; and
an exhaust system fluidly coupled to the turbine system,
wherein the shaft extends from the compressor system to the turbine system.

19. A compressor blade for a gas turbine engine, the compressor blade comprising:
a root configured to engage a hub of the gas turbine engine; and
an airfoil having a suction side, a pressure side, a leading edge connecting the suction and pressure sides, and a trailing edge connecting the suction and pressure sides opposite the leading edge, the airfoil extending a span distance from the root to a tip of the airfoil along a radial direction,
wherein the airfoil has a thickness profile curve at a midpoint of a chord extending between the leading edge and the trailing edge that
has a slope greater than 5% over a base region disposed adjacent to the root, the base region extending between 10 to 40% of the span distance along the radial direction,
has a slope less than 5% over a mid-span region disposed between the base region and the tip, the mid-span region extending between 10 to 40% of the span distance along the radial direction, and
has a slope greater than 5% throughout a remaining portion of the span distance disposed between the mid-span region and the tip, and
wherein the base region has a substantially constant slope of decreasing thickness, and the remaining portion of the span distance disposed between the mid-span region and the tip has a substantially constant slope of decreasing thickness.

20. A compressor, comprising:
a shaft;
a hub connected to the shaft; and
the compressor blade of claim 19 connected to the hub.

21. A gas turbine engine, comprising:
a compressor system having the compressor of claim 20;
a combustor system fluidly coupled to the compressor system;
a turbine system fluidly coupled to the combustor system; and
an exhaust system fluidly coupled to the turbine system,
wherein the shaft extends from the compressor system to the turbine system.

22. A compressor blade for a gas turbine engine, the compressor blade comprising:
a root configured to engage a hub of the gas turbine engine;
an airfoil having a suction side, a pressure side, a leading edge connecting the suction and pressure sides, and a trailing edge connecting the suction and pressure sides opposite the leading edge, the airfoil extending a span distance from the root to a tip of the airfoil along a radial direction,
wherein the airfoil has a thickness profile curve at a midpoint of a chord extending between the leading edge and the trailing edge that
has a slope greater than 5% throughout a first quarter of the span distance, the first quarter of the span distance being adjacent to the root,
has a slope less than 5% within a second quarter of the span distance, the second quarter of the span distance being disposed between the first quarter of the span distance and the tip, and
has a slope greater than 5% throughout a remaining portion of the span distance disposed between the second quarter of the span distance and the tip, and
wherein a thickness of the airfoil decreases by 55-65% throughout the span distance of the airfoil.

23. A compressor, comprising:
a shaft;
a hub connected to the shaft; and
the compressor blade of claim 22 connected to the hub.

24. A gas turbine engine, comprising:
a compressor system having the compressor of claim 23;
a combustor system fluidly coupled to the compressor system;
a turbine system fluidly coupled to the combustor system; and
an exhaust system fluidly coupled to the turbine system,
wherein the shaft extends from the compressor system to the turbine system.

* * * * *

UNITED STATES PATENT AND TRADEMARK OFFICE
CERTIFICATE OF CORRECTION

PATENT NO. : 9,506,347 B2  Page 1 of 1
APPLICATION NO. : 13/720640
DATED : November 29, 2016
INVENTOR(S) : Jeremiah W. Key It is certified that error appears in the above-identified patent and that said Letters Patent is hereby corrected as shown below:

On the Title Page

Column 2, Item (74) (Attorney, Agent, or Firm), Lines 1-2, delete "Finnegan, Henderson, Farabow, Garrett & Dunner, LLP" and insert -- Finnegan, Henderson, Farabow, Garrett & Dunner, LLP; Hibshman Claim Construction PLLC --.

Signed and Sealed this
Eighteenth Day of April, 2017

Michelle K. Lee
*Director of the United States Patent and Trademark Office*